United States Patent
Pocino et al.

(10) Patent No.: US 9,924,252 B2
(45) Date of Patent: Mar. 20, 2018

(54) LOUDSPEAKER ARRANGEMENT WITH ON-SCREEN VOICE POSITIONING FOR TELEPRESENCE SYSTEM

(71) Applicant: POLYCOM, INC., San Jose, CA (US)

(72) Inventors: Michael A. Pocino, Marietta, GA (US); Kwan K. Truong, Alpharetta, GA (US); Jinwei Feng, Woburn, MA (US); James M. Sharp, Austin, TX (US)

(73) Assignee: Polycom, Inc., San Jose, CA (US)

( * ) Notice: Subject to any disclaimer, the term of this patent is extended or adjusted under 35 U.S.C. 154(b) by 225 days.

(21) Appl. No.: 14/201,348

(22) Filed: Mar. 7, 2014

(65) Prior Publication Data

US 2014/0270302 A1    Sep. 18, 2014

Related U.S. Application Data

(60) Provisional application No. 61/779,591, filed on Mar. 13, 2013.

(51) Int. Cl.
*H04R 5/02* (2006.01)
*H04R 1/02* (2006.01)
(Continued)

(52) U.S. Cl.
CPC ............. *H04R 1/028* (2013.01); *H04N 7/142* (2013.01); *H04N 7/15* (2013.01); *H04R 5/04* (2013.01);
(Continued)

(58) Field of Classification Search
CPC ........... H04R 1/028; H04N 7/142; H04N 7/15
(Continued)

(56) References Cited

U.S. PATENT DOCUMENTS

| | | | |
|---|---|---|---|
| 5,291,556 A | * | 3/1994 | Gale ........................ G06F 3/16 |
| | | | 348/14.08 |
| 5,548,346 A | | 8/1996 | Mimura et al. |

(Continued)

FOREIGN PATENT DOCUMENTS

| | | |
|---|---|---|
| CN | 101874398 A | 10/2010 |
| EP | 2574050 A1 | 3/2013 |
| GB | 2473886 A | 3/2011 |

OTHER PUBLICATIONS

Bauer, "Phasor Analysis of Some Stereophonic Phenomena," IRE Transactions on Audio, Feb. 1962, pp. 18-21.

(Continued)

*Primary Examiner* — Vivian Chin
*Assistant Examiner* — Ammar Hamid
(74) *Attorney, Agent, or Firm* — Blank Rome, LLP

(57) ABSTRACT

A videoconferencing system has a plurality of displays arranged side-by-side. Top loudspeakers are arranged adjacent the tops of the displays, and bottom loudspeakers are arranged adjacent the bottoms of the displays. A control unit operatively coupled to the displays and the loudspeakers routes video to each of the displays and routes audio corresponding to each display to any of the top and bottom loudspeakers arranged adjacent the display. Thus, the top and bottom loudspeakers form a vertical pair of loudspeakers that output the corresponding audio for its respective display. In this way, the audio for the video of a given display is perceived by participants to originate from the center of the given display. If one of the loudspeakers is not provided, gain setting and mixing between adjacent sets of loudspeakers can produce a virtual loudspeaker for the one that is missing.

24 Claims, 10 Drawing Sheets

(51) Int. Cl.
*H04N 7/14* (2006.01)
*H04N 7/15* (2006.01)
*H04R 5/04* (2006.01)
H04R 27/00 (2006.01)
H04S 1/00 (2006.01)
H04S 3/00 (2006.01)

(52) U.S. Cl.
CPC .......... *H04R 27/00* (2013.01); *H04R 2499/15* (2013.01); *H04S 1/00* (2013.01); *H04S 3/00* (2013.01); *H04S 2400/15* (2013.01)

(58) Field of Classification Search
USPC ............. 381/333, 72, 94.6; 348/14.07, 14.08
See application file for complete search history.

(56) References Cited

U.S. PATENT DOCUMENTS

| | | | | |
|---|---|---|---|---|
| 7,602,924 B2* | 10/2009 | Kleen | ............... | H04R 5/02 381/124 |
| 2005/0047624 A1 | 3/2005 | Kleen | | |
| 2009/0089055 A1* | 4/2009 | Caspi | ............... | H04M 3/56 704/235 |
| 2009/0096861 A1 | 4/2009 | Saleh et al. | | |
| 2009/0225152 A1 | 9/2009 | Saleh et al. | | |
| 2011/0103624 A1* | 5/2011 | Ferren | ............... | H04N 7/15 381/306 |
| 2011/0310214 A1 | 12/2011 | Saleh et al. | | |
| 2012/0098921 A1 | 4/2012 | Stedman et al. | | |
| 2012/0200658 A1 | 8/2012 | Duckworth et al. | | |

OTHER PUBLICATIONS

Gerzon, "Panpot Laws for Multispeaker Stereo," AES an Audio Engineering Society Preprint, Mar. 1992, 40 pages.
Pulkki, "Virtual Sound Source Positioning Using Vector Base Amplitude Panning," J. Audio Eng. Soc., vol. 45, No. 6, Jun. 1997, pp. 456-466.
Pulkki, "Uniform Spreading of Amplitude Panned Virtual Sources," IEEE Workshop on Applications of Signal Processing to Audio and Acoustics, Oct. 1999, 4 pages.
Kyriakakis, et al., "Phantom Audio Sources with Vertically Seperated Speakers," Audio Engineering Society 119th Convention Paper 6614, Oct. 2005, 6 pages.
"Polycom RealPresence Experience High Definintion (RPX HD)—The true definition of a telepresence experience," Polycom, Inc., Jan. 2007, 6 pages.
"Polycom RealPresence Experience High Definition (RPX HD) User Guide," Polycom, Inc., Version 1.5, Apr. 2008, 32 pages.
"Polycom Open Telepresence Experience OTX 300," Polycom, Inc., Jun. 2010, 9 pages.
"Polycom Open Telepresence Experience—A Polycom Solution Brochure," Polycom, Inc., 2010, 8 pages.
Extended Search Report in counterpart EP Appl. 14159639.5, dated Apr. 3, 2017, 10-pgs.
First Office Action in counterpart Chinese Appl. 201410091560.2, dated Dec. 19, 2016, 9-pgs.

* cited by examiner

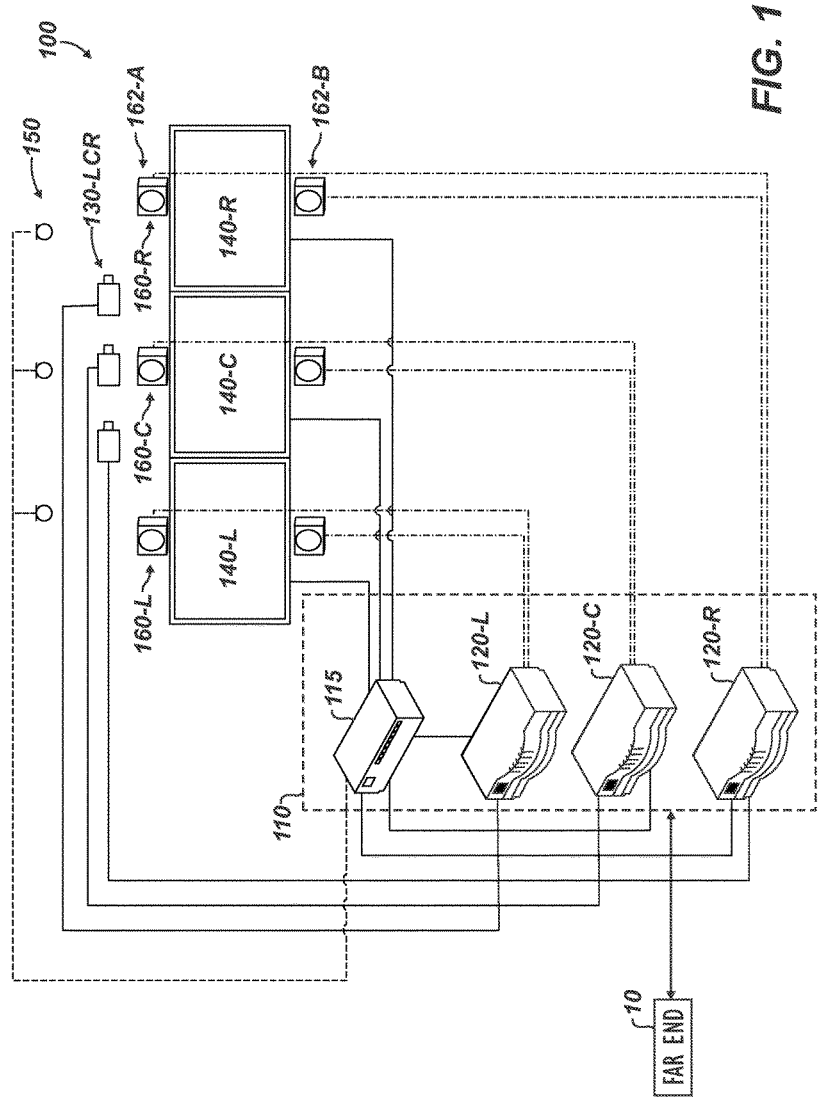

LOUDSPEAKER ARRANGEMENT WITH ON-SCREEN VOICE POSITIONING FOR TELEPRESENCE SYSTEM

CROSS-REFERENCE TO RELATED APPLICATION

This application claims the benefit of U.S. Provisional Appl. 61/779,591, filed 13 Mar. 2013, which is incorporated herein by reference in its entirety.

BACKGROUND OF THE DISCLOSURE

Organizations use videoconferencing systems to conduct meetings. Some rudimentary videoconferencing systems include one or two screens and videoconferencing equipment. However, organizations continually desire to make videoconferences more interactive and effective.

One way to achieve interactive videoconferences involves building a meeting room equipped with specifically designed displays, cameras, microphones, and tables. This type of videoconferencing system requires a great deal of space and capital investment to build. Examples of this type of videoconferencing system include the Polycom® Real-Presence™ Experience High Definition (RPX™ HD) system.

In the RPX™ HD systems, for example, a specially designed suite is constructed to accommodate anywhere from 4 to 28 participants. The custom suite is fitted with specific furniture, chairs, a ceiling cloud of acoustic baffling, studio lighting, a sound paneling back wall, videoconferencing equipment, ceiling microphones, and a full-screen video display (8'×42" or 16'×42"). Other telepresence systems include the Polycom® Open Telepresence Experience™ (Polycom OTX™) solution, which has a set of integrated displays and cameras connected directly to a table for participants.

Current videoconferencing systems are at best configured for stereo audio using stereo loudspeakers. Because the systems use microphones in proximity to the loudspeakers, the system relies on echo cancellation of the stereo audio to handle any acoustic coupling of the far-end audio that is output by the loudspeakers and is being picked up by the local microphones to prevent that echo audio from being sent back to the far-end. Such echo is distracting so that current videoconferencing systems are configured to, and are at best mainly capable of, handling echo cancellation in stereo environments, but not more complicated environments.

Stereo loudspeakers have been used on the left and right sides of the set of displays in the telepresence system. Using stereo loudspeakers in these locations, however, does not work well due to the large seating area that telepresence systems' have. Most listeners are seated outside of the stereo "sweet spot" of the loudspeakers and simply perceive the talker's voice as coming only from the nearest loudspeaker (i.e., at the left or right edge of the set of displays).

Rather than positioning the loudspeakers at the sides of the displays, telepresence systems in the past have had loudspeakers placed either above the display or below display. When LCD screens or the like are used, for example, the loudspeakers are located at the edges of the displays (or farther away). The resulting distance between a talker's audio location and the video image of the talker can seem unnatural and can diminish the interactive feel of the multi-display telepresence system. For this reason, creating the illusion that speech is coming from the center of an electronic display (where loudspeakers cannot be located) can be difficult.

As long as smaller displays are used, there is not very much displacement between the loudspeaker and the center of the display's screen so listeners do not find the offset of the loudspeaker's output and the video image of the talker to be noticeable or objectionable. As taller screens are being used in telepresence systems, the vertical displacement between the image of the talker on the screen and the apparent location of the talker's voice increases, making the resulting experience more objectionable and unnatural.

The subject matter of the present disclosure is directed to overcoming, or at least reducing the effects of, one or more of the problems set forth above.

SUMMARY OF THE DISCLOSURE

In a multi-display telepresence system, it is desirable for listeners to perceive the speech from talkers on the telepresence displays as coming from or at least near the same location as the talkers' actual images on the displays. If projectors are used for the video, an acoustically transparent screen may be used, and the loudspeakers may be placed behind the screens at locations corresponding to the talker's images.

In this embodiment, a videoconferencing system includes at least one acoustically transparent display having first and second display portions. At least one first loudspeaker is disposed behind the first display portion, and at least one second loudspeaker is disposed behind the second display portion. A control unit is operatively coupled to the at least one first loudspeakers and the at least one second loudspeakers. The control unit is configured to route first video to the first display portion and to route second video to the second display portion. The control unit is also configured to route first audio associated with the first video to the at least one first loudspeaker and to route second audio associated with the second video to the at least one second loudspeaker. Although this is a good approach for a projection system, it is not compatible with LCD screens, electronic displays, or other screens commonly used for telepresence systems.

In another embodiment, a videoconferencing system includes at least one display, a plurality of top loudspeakers, a plurality of bottom loudspeakers, and a control unit. The top loudspeakers are arranged toward a top of the at least one display, and the bottom loudspeakers are arranged toward a bottom of the at least one display. The loudspeakers can be disposed either inside or outside the outer perimeter of the at least one display, depending on the type of display used.

The control unit is operatively coupled to the top loudspeakers and the bottom loudspeakers. The control unit is configured to route first video to a first display portion of the at least one display, and the control unit is configured to route first audio associated with the first video to any one or both of the top and bottom loudspeakers arranged relative to the first display portion. Additionally, the control unit is configured to route second video to a second display portion of the at least one display, and the control unit is configured to route second audio associated with the second video to any one or both of the top and bottom loudspeakers arranged relative to the second display portion.

In one implementation, the at least one display can include a plurality of electronic screens disposed adjacent one another, and the top and bottom loudspeakers can be arranged in vertical pairs. Each of the electronic screens can have at least one of the vertical pairs. In this arrangement, the control unit can be configured to route the first video to a first of the electronic screens as the first display portion and to route the second video to a second of the electronic screens as the second display portion.

In another implementation, the at least one display can include at least one projector screen having the first and second video projected thereon. Additionally, the at least one display can include at least one projector projecting the first and second video. In yet another implementation, the at least one display can include an acoustically transparent display having any one or more of the top and bottom loudspeakers disposed inside an outer perimeter thereof.

In one embodiment during a videoconference, the top loudspeakers include a first top loudspeaker disposed relative to the first display portion, and the bottom loudspeakers include a first bottom loudspeaker disposed relative to the first display portion. To route the first audio, the control unit is configured to route at least a portion of the first audio to the first top loudspeaker and at least a portion of the first audio to the first bottom loudspeaker. Furthermore, in routing the first audio, the control unit can emphasize a lower frequency of the portion of the first audio routed to the first top loudspeaker than routed to the first bottom loudspeaker.

Additionally, the top loudspeakers include a second top loudspeaker disposed relative to the second display portion, and the bottom loudspeakers include a second bottom loudspeaker disposed relative to the second display portion. To route the second audio, the control unit is configured to route at least a portion of the second audio to the second top loudspeaker and at least a portion of the second audio to the second bottom loudspeaker. Furthermore, in routing the second audio, the control unit can emphasize a lower frequency of the portion of the second audio routed to the second top loudspeaker than routed to the second bottom loudspeaker.

In an additional embodiment, the at least one display includes an intermediate display portion disposed between the first and second display portions. The control unit is configured to route third video to the intermediate display portion and to route third audio associated with the third video to any one or both of the top and bottom loudspeakers arranged relative to the intermediate display portion.

In one arrangement, the top loudspeakers can include a third top loudspeaker disposed relative to the intermediate display portion, and the bottom loudspeakers can include a third bottom loudspeaker disposed relative to the intermediate display portion. The control unit is configured to route at least a portion of the third audio to the third top loudspeaker and at least a portion of the third audio to the third bottom loudspeaker. Here, the control unit can also emphasize a lower frequency of the portion of the third audio routed to the third top loudspeaker than routed to the third bottom loudspeaker.

In an alternative arrangement, the bottom loudspeakers can include a third bottom loudspeaker disposed relative to the intermediate display portion, and the system can lack a third top loudspeaker. The control unit is configured to route at least a portion of the third audio to the first and second top loudspeakers and at least a portion of the third audio to the third bottom loudspeaker. Here, to route the third audio, the control unit can emphasize a higher frequency of the portion of the third audio routed to the third bottom loudspeaker than routed to the first and second top loudspeakers.

In another alternative arrangement, the top loudspeakers can include a third top loudspeaker disposed relative to the intermediate display portion, and the system can lack a third bottom loudspeaker. The control unit is configured to route at least a portion of the third audio to the third top loudspeaker and at least a portion of the third audio to the first and second bottom loudspeaker. Here, to route the third audio, the control unit can emphasize a lower frequency of the portion of the third audio to the third top loudspeaker than routed to the first and second bottom loudspeakers.

The foregoing summary is not intended to summarize each potential embodiment or every aspect of the present disclosure.

BRIEF DESCRIPTION OF THE DRAWINGS

FIG. 1 illustrates an integrated videoconferencing system according to the present disclosure.

DETAILED DESCRIPTION OF THE DISCLOSURE

Figure 2A:
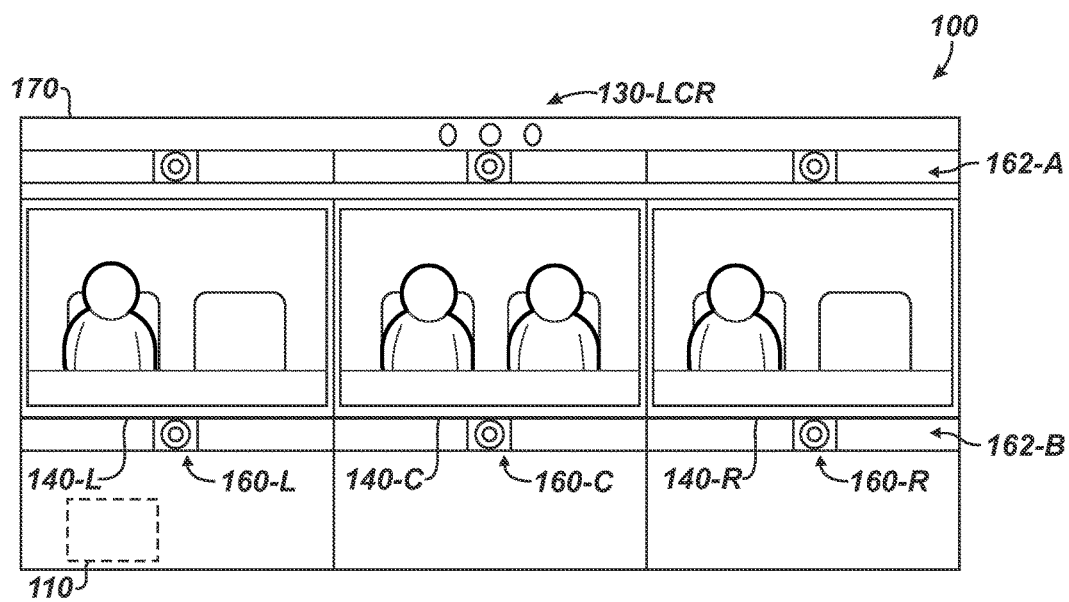
FIG. 2A shows the integrated videoconferencing system incorporated into a credenza or other housing.

An integrated videoconferencing system 100 (a.k.a. telepresence system) schematically shown in FIG. 1 includes a control unit 110, multiple camera units 130-LCR, and multiple displays 140-LCR. In this example, the system 100 has three camera units 130-LCR and three displays 140-LCR, but any number of camera units and displays can be used. The system 100 also includes additional audio/visual (A/V) equipment and near-end components, including microphones 150 and vertical loudspeaker pairs 160-LCR. The microphones 150 can be ceiling mounted or table mounted microphones.

The control unit 110 can be an integrated component or can comprise several operably connected components. As shown, the control unit 110 has a controller 115 and three codecs 120-LCR (Left (L), Center (C), and Right (R)). The codecs 120-LCR handle the video streams for the videoconference. One of the codecs 120-C can be the primary codec and can handle audio for the videoconference, being coupled to the microphones 150 and the system's vertical loudspeaker pairs 160-LCR via audio lines. This primary codec 120-C can also be coupled to any content displays (not shown) and content inputs via XGA and audio lines. To handle video, each of the codecs 120-LCR is respectively coupled to one of the camera units 130-LCR via a component line, and each of the codecs 120-LCR is also respectively coupled to one of the displays 140-LCR via a DVI line.

The controller 115 is coupled to each of the codecs 120-LCR and the displays 140-LCR via control lines to control operation of the system 100. The controller 115 can also include a computer to co-ordinate the NV system and networking details. The controller 115 and codecs 120-LCR include conventional videoconferencing components to conduct a videoconference between near-end participants and one or more far-end units 10 via a communication connection 112. These videoconferencing components are known and used in the art and are not described in detail herein.

The control unit 110 receives videoconference information from the one or more far-end units 10, which may be a single comparable videoconferencing system in a point-to-point call or may be several separate far-end endpoints in a multipoint call. In either case, several video feeds are supplied to the control unit 110 along with several associated audio channels for handling by the system 100. The control unit 110 also obtains several video feeds from the cameras 130-LCR and produces a comparable number (i.e., three) of audio channels from the microphones 150. Separate microphones 150 can be used for each channel, or combinations or groupings of microphones 150 can be used for each channel. Beam steering or other audio isolation techniques can also be used from several microphones 150 to produce the needed channels. As will be appreciated by other embodiments disclosed herein, the system 100 can use more or less channels, but the number of audio channels preferably matches the number of captured video feeds.

Because the system 100 has a plurality of loudspeakers 162 and microphones 150, the control unit 110 preferably uses echo cancellation for each channel of audio generated. For the present example where the system 130 outputs three audio channels through the loudspeaker pairs 160-LCR and captures three audio channels with the microphones 150, the disclosed system 100 is preferably capable of performing echo cancellation on three correlated audio channels. For systems 100 disclosed herein having more or less audio channels, the echo cancellation capabilities are preferably capable of handling the requisite number of channels.

As shown in the example of FIG. 2A, the control unit 110, codecs 120-LCR, camera units 130-LCR, displays 140-LCR, and vertical loudspeaker pairs 160-LCR can all be integrated into a housing or credenza 170. Because it is integrated, the credenza 170 allows the system 100 to be set up in an office space or room that may not readily be suited to accommodate these videoconferencing components. Rather than such an integrated credenza 170, the installation of the system 100 may be in a room or space specifically designed to accommodate such components.

Figure 2B:
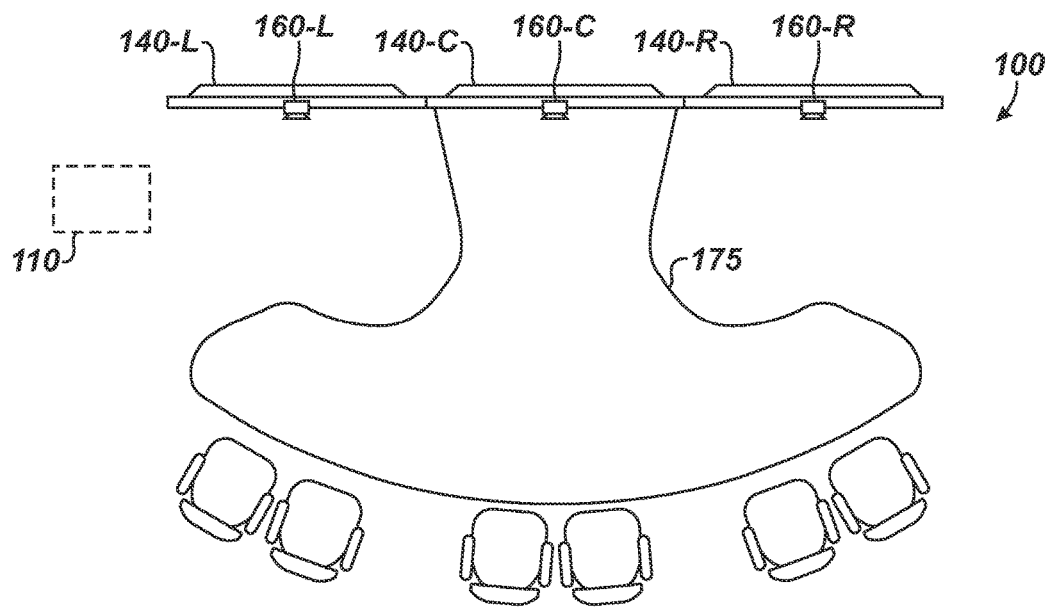
FIG. 2B shows a plan view of the integrated videoconferencing system having displays arranged substantially flat relative to one another along a plane or wall so that corresponding loudspeaker pairs are similarly arranged on a plane.
Figure 2C:
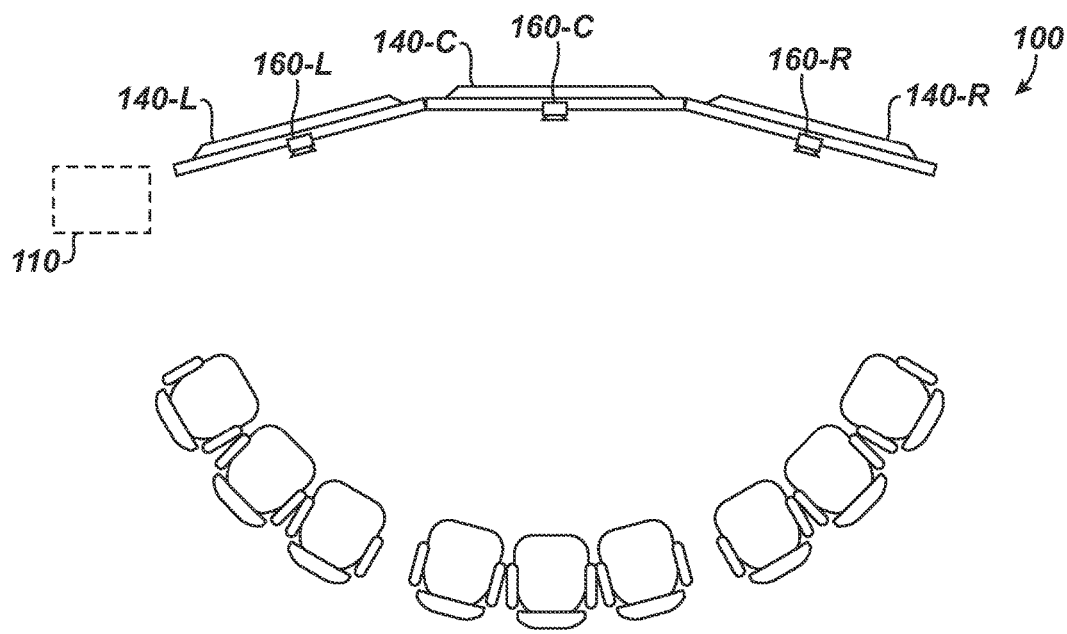
FIG. 2C shows a plan view of the integrated videoconferencing system having displays arranged at angles relative to one another with loudspeaker pairs comparably arranged.

As shown in the plan view of FIG. 2B, the displays 140-LCR can be arranged substantially flat relative to one another along a plane or wall so that the corresponding loudspeaker pairs 160-LCR can be similarly arranged on a plane. In FIG. 2C, however, the displays 140-LCR can be arranged at angles relative to one another with the loudspeaker pairs 160-LCR comparably arranged. In either case, the participants may be seated opposite the displays 140-LCR in seats in a reversed angled arrangement. The seating would preferably be predetermined at a particular distance and orientation relative to the displays 140-LCR and other components of the disclosed system 100. In fact, as shown in FIG. 2B, an integrated desk 175 may be used with the seating.

As depicted in FIG. 1 and shown more emphatically in the schematic arrangement of the system in FIG. 3, each of the displays 140-LCR in the system 100 has a vertical loudspeaker pair 160-LCR, and each pair 160-LCR has a top loudspeaker 162-A positioned above each display 140-LCR and has a bottom loudspeaker 162-B positioned below each display 140-LCR along a vertical centerline.

Figure 3:
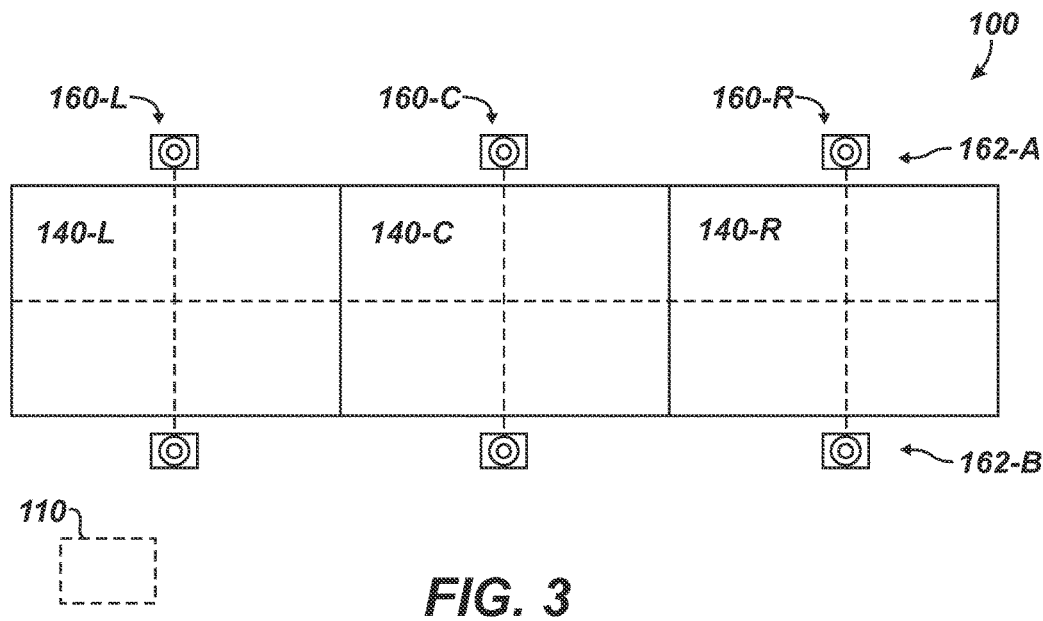
FIG. 3 schematically illustrates one arrangement of displays and loudspeakers of the disclosed system.

During a videoconference with the system 100 as in FIG. 3, audio for a talker shown on a given display 140-LCR is played out of that display's corresponding vertical loudspeaker pair 160-LCR. Routing of the audio to the particular loudspeaker pair 160-LCR based on which participants are displayed on a particular display 140-LCR is handled by the control unit 110 and/or the particular display's corresponding codec (120-LCR). For example, for video of far-end participants routed to the left display 140-L, any audio associated with those far-end participants is routed to the display's vertical loudspeaker pair 160-L for output.

The top and bottom loudspeakers 162A, 162B in each pair 160-LCR preferably have angled orientations, and their outputs are preferably balanced to convey that the audio for the participants shown on a given display 140-LCR comes from roughly the center of the display 140-LCR. Overall, the angle and balance of the loudspeakers 162A, 162B depends on the expected number and probable location of near-end participants who may be present in front of the displays 140-LCR, and the particular details of the angle and balance can be configured for the particular implementation.

Figure 4A:
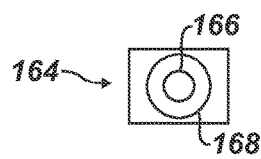
FIGS. 4A-4C shows various loudspeaker configurations for the disclosed system.
Figure 4B:
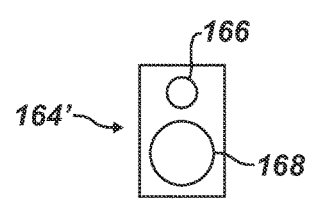
Figure 4C:
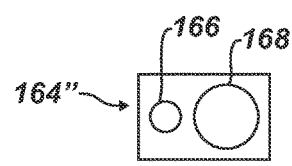

Moreover, the loudspeakers 162 are preferably arranged to take up less space. For example, FIGS. 4A-4C shows various types of loudspeaker configurations that can be used for the disclosed system 100. Preferably, as shown in FIG. 4A, one loudspeaker configuration 164 used with the disclosed system has a tweeter 166 concentrically located relative to a woofer 168, which makes the loudspeaker configuration 164 more compact and easier to place above and below a display (140). As an alternative shown in FIG. 4B, another loudspeaker configuration 164' used with the disclosed system can have a satellite tweeter 166 mounted vertically relative to a woofer 168, which is a conventional configuration and aligns well with the vertical loudspeaker pairs (160) of the system. Yet, as shown in FIG. 4C, a satellite tweeter 166 can be mounted horizontally to a woofer 168, but this configuration 164" may not be preferred when disposed above or below a display (140) because the horizontal mounting is off-axis to the vertical loudspeaker pairs (160) used.

Even with such considerations being taken care of, the near-end participants of the system 100 in FIG. 3 may still perceive low frequencies as coming mainly from the bottom loudspeaker 162-B in each pair 160-LCR and may perceive high frequencies as coming mainly from the top loudspeaker 162-A. To compensate for this, the control unit 110 includes shelving equalizers (not shown) that emphasize low frequencies in the top loudspeaker 162-A and conversely emphasizes high frequencies at the bottom loudspeaker 162-B of each pair 160-LCR. In one example, a low shelf at 700 Hz (+/−3 dB) and a high shelf at 4 kHz (−/+3 dB) can be applied with opposite gains to the top and bottom loudspeakers 162A, 162-B. This has the effect of "tightening up" the perceived position as more distinctly coming from the center of each display 140-LCR. Other equalization schemes can be used, depending on the implementation.

During the videoconference, the perceived horizontal position of each talker (from left to right) distinctly comes from the center of the display 140-LCR with that talker's video image. This position is perceived as being quite accurate for listeners seated throughout the listening area (which can be quite large). Additionally, the perceived audio also comes vertically in the center of each display 140-LCR at the level of the talker's heads. Overall, this creates a very interactive feel for the room and should create a very comfortable and natural experience for end users.

Figure 5:
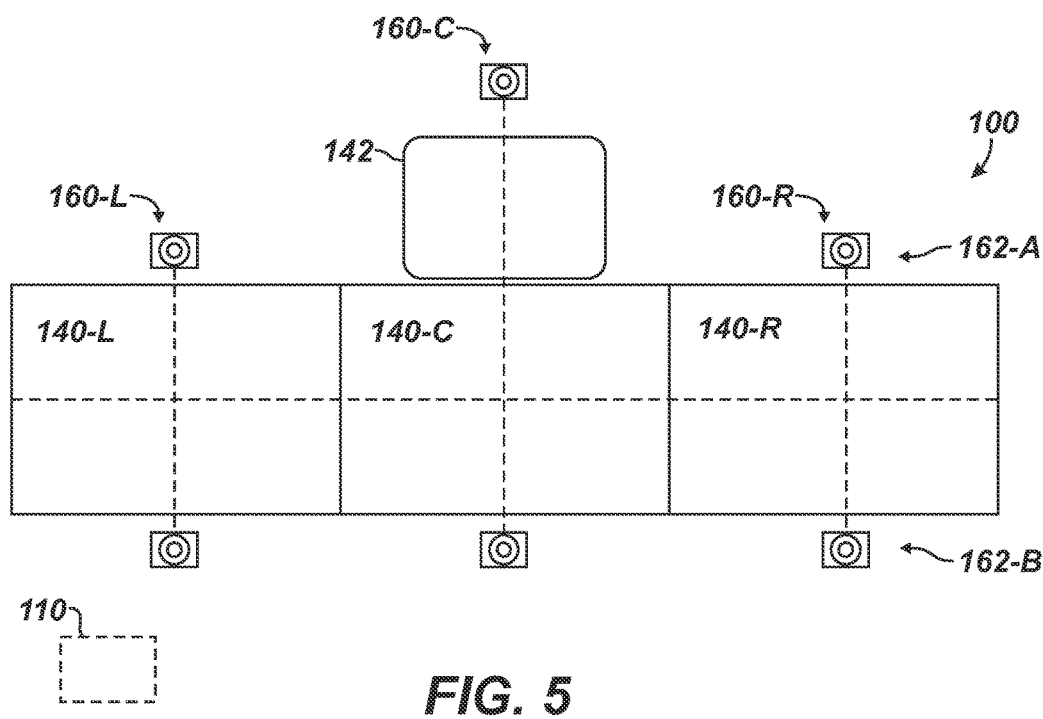
FIG. 5 schematically illustrates another arrangement of displays and loudspeakers of the disclosed system, further including a content display.

Having vertical pairs 160-LCR for every display 140-LCR in the system 100 is preferred. In some implementations, an additional content display 142 is used for displaying content during a videoconference, and such a content display 142 may be positioned above the center display 140-C, as shown in FIG. 5. In this arrangement, the upper loudspeaker 162-A of the center pair 160-C is positioned at an elevated level above the content display 142. The system 100 is configured to still achieve the same purposes as other systems disclosed herein. As will be appreciated, any delay, equalization, gain, or other settings associated with the loudspeaker pairs 160-LCR, and especially the offset upper loudspeaker 162-A of the center pair 160-C, may need to be different than in previous arrangements to account for the offset distance.

Figure 6A:
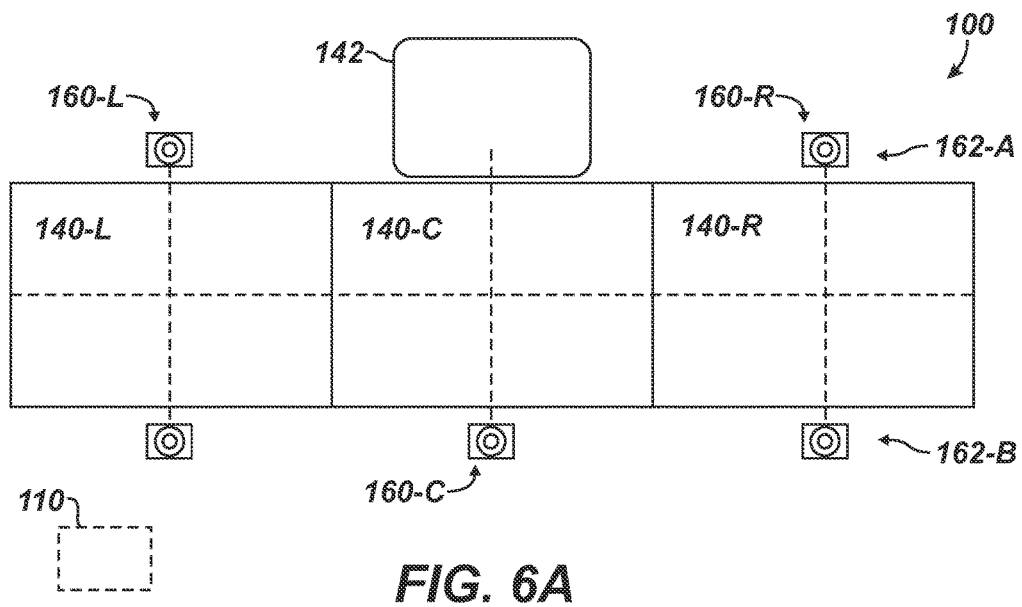
FIG. 6A schematically illustrates another arrangement of displays and loudspeakers of the disclosed system, lacking a top center loudspeaker.

In some implementations, it may not be possible to place a loudspeaker directly above a display. For example, FIG. 6A illustrates another arrangement of the displays 140-LCR and loudspeaker pairs 160-LCR of the disclosed system 100. A content display 142 is placed above the center display 140-C. The height of the arrangement and the size of the room may not permit a top center loudspeaker of the central pair 160C to be positioned above the center display 140-C. Alternatively, it may be the case that the top center loudspeaker cannot be added to the system 100 due to the location of the cameras (not shown) or some other obstruction other than the content 142.

In either case, a combination of gain settings and input channel mixing is used to compensate for the missing top center loudspeaker. Table 1 below shows example mixing gain values for the five loudspeakers 140-LCR in the system 100 of FIG. 6A to compensate for the missing top center loudspeaker.

TABLE 1

Relative Mix Levels to Achieve Phantom Top, Center Loudspeaker

|  | Left Top Level | Left Bottom Level | Center Bottom Level | Right Top Level | Right Bottom Level |
| --- | --- | --- | --- | --- | --- |
| Left Display's Audio | 0 dB | 0 dB | ø | ø | ø |
| Center Display's Audio | −6 dB | ø | +5 dB | −6 dB | ø |
| Right Display's Audio | ø | ø | ø | 0 dB | 0 dB |

The gain and mixing settings shown here and elsewhere in the present disclosure are meant to be illustrative, and the values and differences between them would likely vary based on the particular details of an implementation, such as the size of the room, the size of the displays, the vertical and horizontal separation between loudspeakers, and other factors. As with other arrangements, higher frequencies may be emphasized in the bottom loudspeakers 162-B, while lower frequencies may be emphasized in the top loudspeakers 162-A. Of course, any equalization settings in this and other arrangements of the present disclosure may also vary due to the differences in gain and mixing settings.

The gain and mixing settings virtualize the missing top center loudspeaker. In fact, experimentation shows that a virtual center loudspeaker is created by mixing the audio information which would be destined for the missing top center loudspeaker into the top right loudspeaker 162-A and the top left loudspeaker 162-A at reduced amounts and by increasing the output of the bottom central loudspeaker 162-B. As a consequence, listeners can perceive center channel information as originating at the center display 140-C as desired.

Figure 6B:
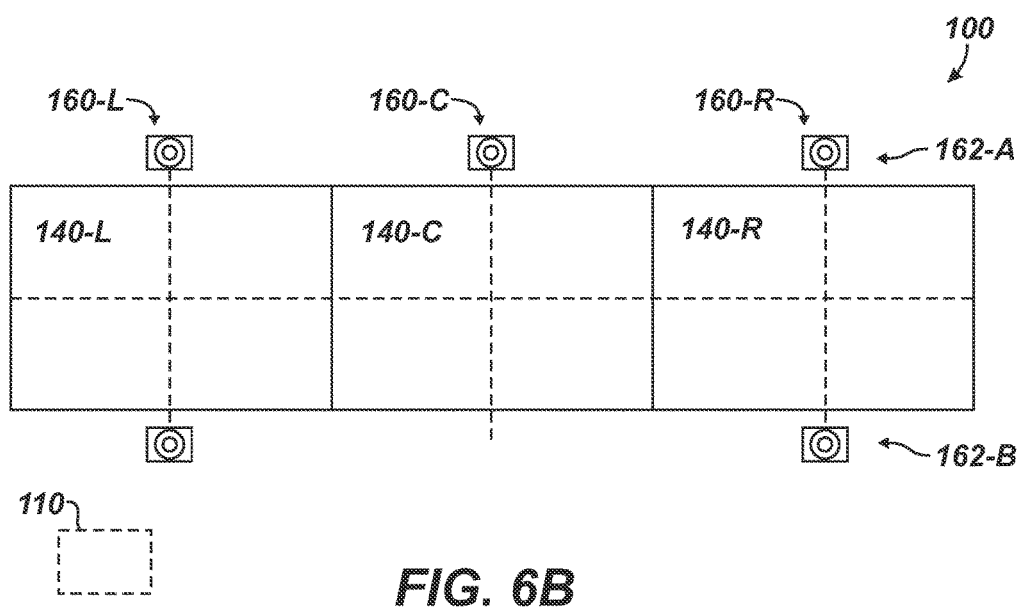
FIG. 6B schematically illustrates another arrangement of displays and loudspeakers of the disclosed system, lacking a bottom central loudspeaker.

Using comparable gain and mixing settings to virtualize a missing top center loudspeaker, the disclosed system 100 can similarly virtualize a bottom central loudspeaker that is missing. For example, FIG. 6B schematically illustrates another arrangement of the displays 140-LCR and loudspeaker pairs 160-LCR of the disclosed system 100, lacking a bottom central loudspeaker. In this situation, gain and mixing settings comparable to those used above, but inverted, can virtualize the missing bottom center loudspeaker.

Table 2 below shows example mixing gain values for the five loudspeakers in the system 100 of FIG. 6B.

TABLE 2

Relative Mix Levels to Achieve Phantom Bottom, Center Loudspeaker

|  | Left Top Level | Left Bottom Level | Center Top Level | Right Top Level | Right Bottom Level |
| --- | --- | --- | --- | --- | --- |
| Left Display's Audio | 0 dB | 0 dB | ø | ø | ø |
| Center Display's Audio | ø | −6 dB | +5 dB | ø | −6 dB |
| Right Display's Audio | ø | ø | ø | 0 dB | 0 dB |

Figure 7:
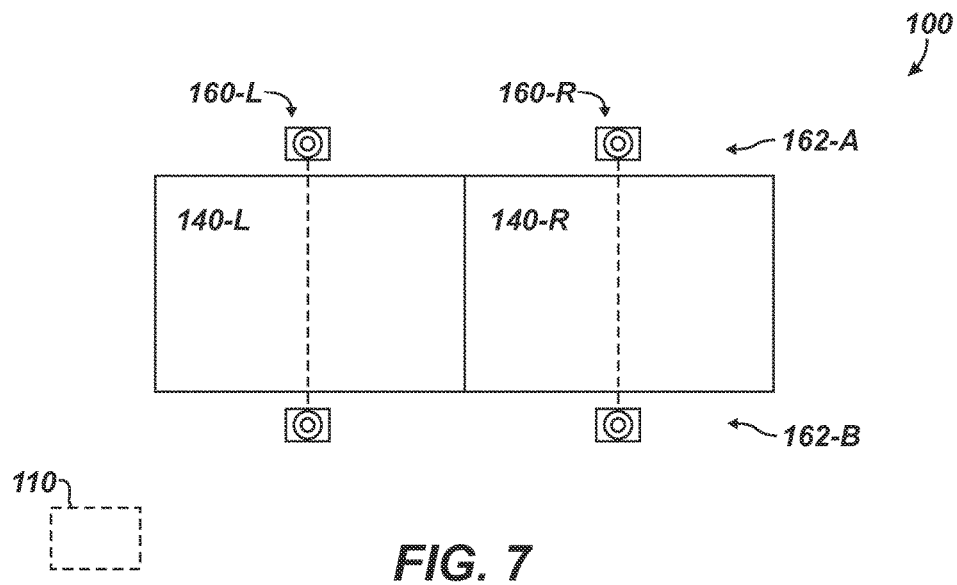
FIG. 7 schematically illustrates an arrangement of the disclosed system having two displays and vertical loudspeaker pairs.

In previous embodiments, the disclosed system 100 had three displays 140-LCR arranged side-by-side. In general, the teachings of the present disclosure can apply to the disclosed system 100 having a plurality of displays (i.e., two or more) arranged side-by-side. For example, FIG. 7 schematically illustrates an arrangement of the disclosed system 100 having two displays 140-LR and two vertical loudspeaker pairs 160-LR. The control unit 110 can perform comparable routing of video and audio to each display 140-LR and vertical loudspeaker pair 160-LR to achieve the same purposes as disclosed herein for other systems.

Figure 8A:
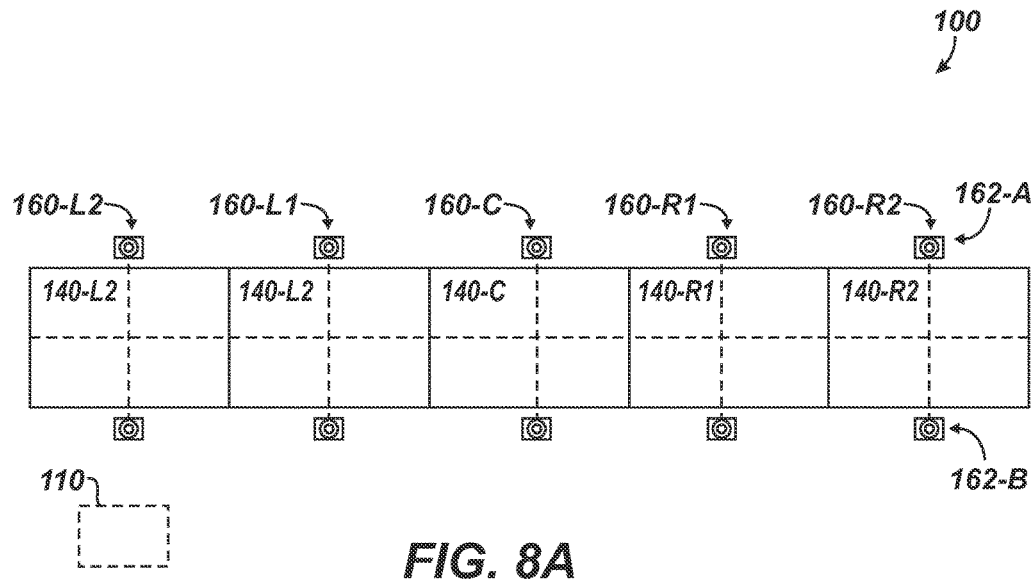
FIG. 8A schematically illustrates an arrangement of the disclosed system having five displays and vertical loudspeaker pairs.

In yet another example, FIG. 8A schematically illustrates an arrangement of the disclosed system 100 having more than three displays 140 (L2, L1, C, R1, R2) and vertical loudspeaker pairs (L2, L1, C, R1, R2), namely five of each. The control unit 110 can perform comparable routing of video and audio to each display 140 (L2, L1, C, R1, R2) and vertical loudspeaker pair 160 (L2, L1, C, R1, R2) to achieve the same purposes as disclosed herein for other systems. Notably, this system 100 will need a 5-channel acoustic echo canceller to deal with possible acoustic coupling between the loudspeaker pairs 160 and any microphones (not shown).

Figure 8B:
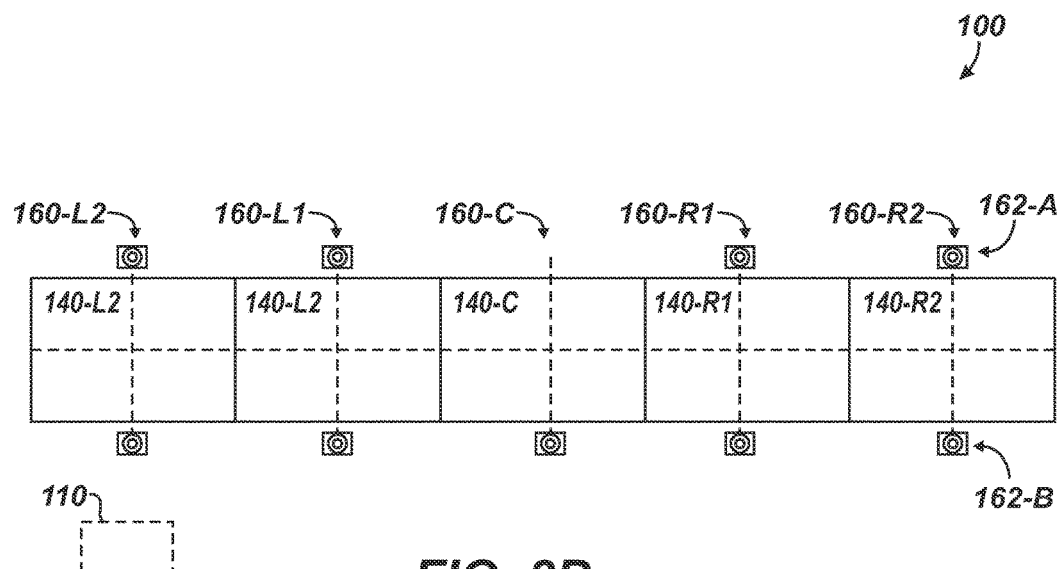
FIG. 8B schematically illustrates an arrangement of the disclosed system having five displays and vertical loudspeaker pairs, lacking the center top loudspeakers.

As before, arrangements of the disclosed system 100 may lack one or more of the top or bottom loudspeakers in a given vertical loudspeaker pair 160. For example, FIG. 8B schematically illustrates an arrangement of the disclosed system 100 having five displays 140 (L2, L1, C, R1, R2) and vertical loudspeaker pairs 160 (L2, L1, C, R1, R2), lacking a top center loudspeaker above the center display 140-C. Gain and mixing settings comparable to those disclosed above in Table 1 can be used with the bottom central loudspeaker 160-C and with the top loudspeakers 162-A of the inner left pair 160-L1 and the inner right pair 160-R1 to virtualize the missing top center loudspeaker.

Figure 8C:
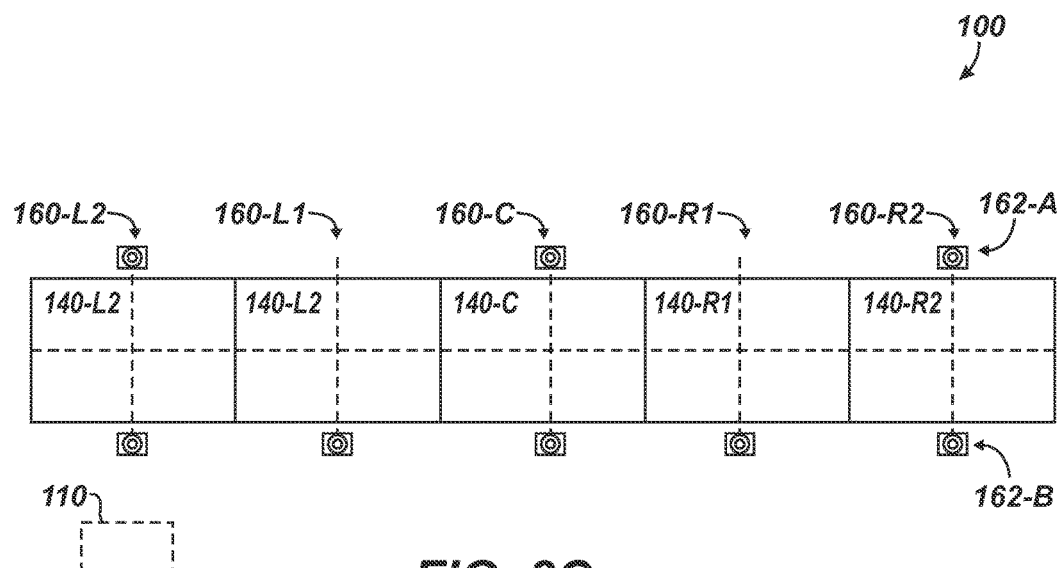
FIG. 8C schematically illustrates an arrangement of the disclosed system having five displays and vertical loudspeaker pairs, lacking two top loudspeakers.

In another example, FIG. 8C schematically illustrates an arrangement of the disclosed system 100 having five displays 140 (L2, L1, C, R1, R2) and vertical loudspeaker pairs 160 (L2, L1, C, R1, R2), lacking some top loudspeakers 162-B in the inner pairs 160-L1 and 160-R1. Gain and mixing settings comparable to those disclosed above can be used with the bottom inner left loudspeaker 160-L1 and the top loudspeakers 162-A of the outer left pair 160-L2 and the central pair 160-C to virtualize the missing top inner left loudspeaker. Likewise, gain and mixing settings comparable to those disclosed above can be used with the bottom inner right loudspeaker 160-R1 and the top loudspeakers 162-A of the outer right pair 160-R2 and central pair 160-C to virtualize the missing top, inner right loudspeaker.

Table 3 below shows example mixing gain values for the system 100 of FIG. 8C.

TABLE 3

Relative Mix Levels to Achieve Phantom Loudspeakers

| | Outer Left Top Level | Outer Left Bottom Level | Inner Left Bottom Level | Center Top Level | Center Bottom Level | Inner Right Bottom Level | Outer Right Top Level | Outer Right Bottom Level |
|---|---|---|---|---|---|---|---|---|
| Outer Left Display's Audio | 0 dB | 0 dB | ø | ø | ø | ø | ø | ø |
| Inner Left Display's Audio | −6 dB | ø | +5 dB | −6 dB | ø | ø | ø | ø |
| Center Display's Audio | ø | ø | ø | 0 dB | 0 dB | ø | ø | ø |
| Inner Right Display's Audio | ø | ø | ø | −6 dB | ø | +5 dB | −6 dB | ø |
| Outer Right Display Audio | ø | ø | ø | ø | ø | ø | 0 dB | 0 dB |

The systems 100 disclosed above have dealt with playing the audio from the far-end 10 relative to each display 140 having the video of the participants corresponding to that audio. Thus, audio for participants shown on a particular display 140 is routed to the loudspeaker pairs 160 associated with the particular display 140. In turn, the systems 100 disclosed herein are configured to associate near-end audio captured with the microphones 150 with captured video from the cameras 130-LCR so the corresponding audio and video can be sent to the far-end for comparable routing by a far-end system. To do this, the systems 100 disclosed herein can rely on one or more dedicated microphones 150 for each of the camera 130-LCR or can use beam steering and talker detection techniques known in the art, as already noted.

Figure 9A:
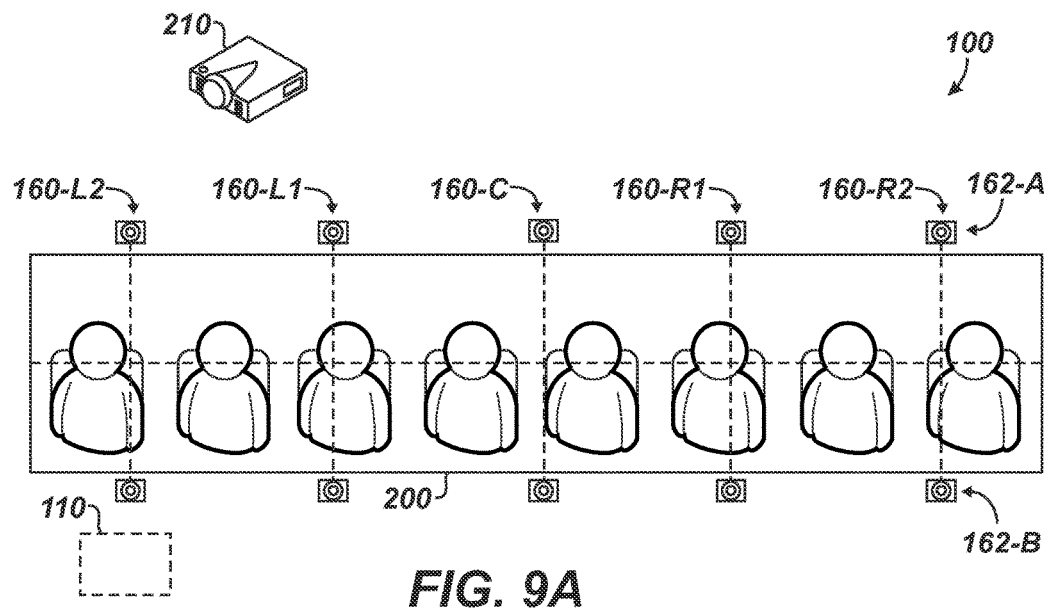
FIGS. 9A-9C schematically illustrate arrangements of the disclosed system having a display in the form of one or more projector screens.

The systems 100 disclosed above have provided a matching number of loudspeaker pairs 160 and displays 140, but this is not strictly necessary. For example, the system 100 as disclosed herein can have five displays and four loudspeaker pairs 160. Moreover, the systems 100 disclosed above have intimated that the displays 140 are electronic displays, such as having LCD screens or the like. This is not strictly necessary as the displays 140 can be projector screens onto which high-definition video can be projected. In fact, FIG. 9A shows an arrangement of the disclosed system 100 having a display 200 in the form of a wide screen (which may include one or more separate projector screens) onto which a wide angle view is projected from one or more remote projectors 210 of the system's video components.

The various participants are projected across the screen 200. As before, the displayed participants may be located at the same far-end 10 or may be participants from several far-ends in a multipoint connection.

Either way, the system 100 is configured with a plurality of vertical loudspeaker pairs 160 with top loudspeakers 162-A arranged along the top of the screen 200 and bottom loudspeakers 162-B arranged along the bottom of the screen 200. Five pairs 160 (L2, L1, C, R1, R2) are shown, but more or less pairs 160 may be provided. Likewise, more or less video images of participants may be displayed on the screen 200 than depicted. In fact, because the screen 200 is meant to be continuous, there are no distinct displays as in previous arrangements. Accordingly, participants can be projected on various portions of the wide screen 200. Thus, there may be a different number of loudspeaker pairs 160 available than any distinct number of participants, video feeds, groups of participants, portions of the screen, or the like.

In this arrangement, the system 100 can operate each of the loudspeaker pairs 160 as before to provide audio for participants projected on the corresponding portion of the screen 200 in much the same way as in previous embodiments. Due to the disconnect between the wide screen 200 and the number of loudspeaker pairs 160, however, the system 100 can selectively adjust what number and arrangement of loudspeaker pairs 160 are used relative to how much of the screen 200 is used or based on what portions of the screen 200 are used for video display of various participants.

Figure 9B:
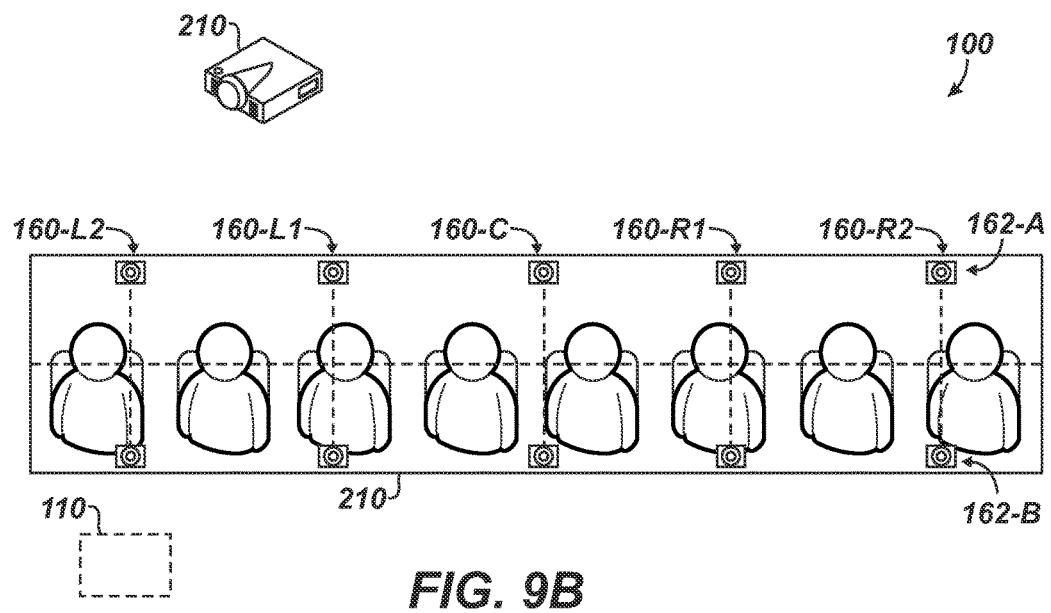

In the system 100 of FIG. 9A, the loudspeakers 162 are arranged outside the area of the screen 200. This may not be necessary if the screen is acoustically transparent. In this case as shown in FIG. 9B, the vertical loudspeaker pairs 160 can be arranged relative to an acoustically transparent screen 210 so that one or both of the top and bottom loudspeakers 162 are disposed behind the acoustically transparent screen 210 (i.e., within the perimeter of the screen 200).

Figure 9C:
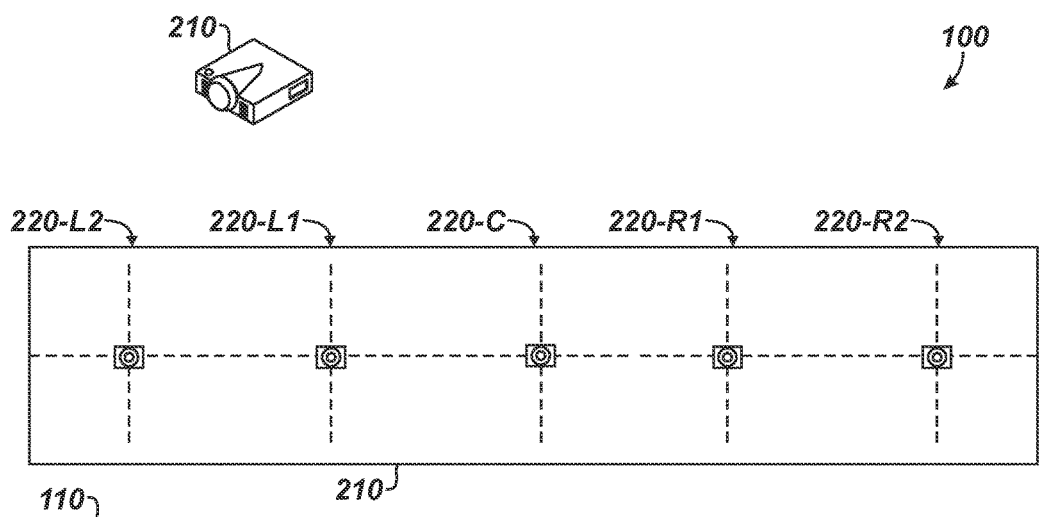

Even in a different arrangement, rather than using pairs, the system 100 as shown in FIG. 9C may simply use a centrally located loudspeaker 220 at a mid-horizontal level behind an acoustically transparent screen 210, if possible, to provide the audio of talkers in respective portions of the screen 210. Although this arrangement may be the most intuitively acceptable as long as the screen 210 used allows for audio to pass through it without objectionable muffling or the like, experiments surprisingly indicate that most listeners find it hard to distinguish between a centrally located loudspeaker 220 as used in FIG. 9C and a vertical loudspeaker pair 160 as used in FIGS. 9A-9B. Therefore, benefits of having the loudspeaker pairs 160 at or near the edge of a screen 200 or 210 as in FIGS. 9A-9B may make those arrangements more favorable in some implementations.

Figure 10A:
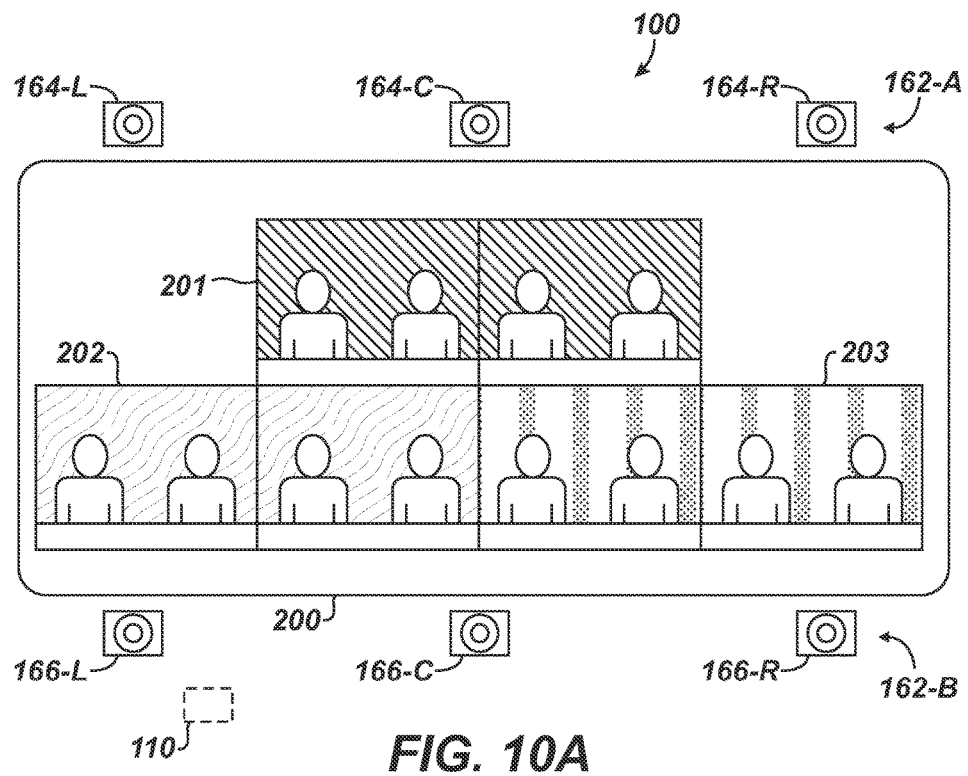
FIGS. 10A-10C schematically illustrate arrangements of the disclosed system used in a multi-point videoconference call.

In fact, having multiple loudspeakers 160 arranged toward the top and bottom of a screen 200 or 210 allows the system to be used with more versatility when the system 100 is used for point-to-point or multi-point videoconference calls. For example, FIG. 10A shows yet another system 100 according to the present disclosure having at least one display 200 and a plurality of top and bottom loudspeakers 162-A and 162-B. Here, the at least one display 200 is a wide screen or video wall, although it could be a plurality of separate screens or electronic displays. In this system 100, the top and bottom loudspeakers 162-A and 162-B can be configured and operated by the control unit 110 as vertical loudspeaker pairs, as with previous arrangements. This can be done especially when this system 100 conducts a point-to-point videoconference call with a far end (not shown).

When the system 100 is part of a multi-point videoconference call with a number of far-end sites, the system 100 can operate each of the top and bottom loudspeakers 162-A and 162-B independently. In other words, the top loudspeakers 164-LCR toward the top of the screen 200 can comprise three separate channels, and the bottom loudspeakers 166-LCR toward the bottom of the screen 200 can comprise three separate channels. In this way, this system 200 has six independent audio channels being rendered into six loudspeakers, three of which are arranged toward the top and three of which are arranged toward the bottom of the display 200. Thus, in this system, any of the loudspeakers 164-LCR and 166-LCR can be active. As will be appreciated, the system 100 can have any number of loudspeakers.

Video from three sites 201, 202, and 203 is displayed on the screen 200 in an arrangement conducive to a multi-point videoconference call. In this example, video of each site 201, 202, and 203 comes from two camera feeds, but this may not always be the case because the multi-point videoconference call can be arranged between any variety of systems with different video capabilities.

In rendering the audio for the videoconference, the system 100 creates a two-dimensional spatial audio experience, where any sound source can be rendered from any of the six channels of the loudspeakers 164-LCR and 166-LCR that best fits the location of the video for the sites 201, 202, and 203 displayed on the screen 200. For instance, the system 100 renders audio for the first site 201 through the top center loudspeaker 164-C to correspond to the location where the video for the first site 201 is displayed on the screen 200. If two channels of input audio come from this first site 201, then the audio can be combined into the one channel for the top center loudspeaker 164-C. Similarly, the system 100 can render audio for the second site 202 through the bottom left loudspeaker 166-L and can render audio for the third site 203 through the bottom right loudspeaker 166-R due to the arrangement of video for these sites 202 and 203.

Mixing of audio between sites could also be performed. For example, if the second and third sites 202 and 203 both have right and left input channels, then an audio arrangement can be constructed to match the layout by having the left audio from the second site 202 rendered to the bottom left speaker 166-L and having the right audio from the third site 203 rendered to the bottom right speaker 166-R. However, the right audio from the second site 202 and the left audio from the third site 203 can be combined to share the bottom center loudspeaker 166-C because its location best matches the location of where those participants are displayed. As will be appreciated, these and other arrangements can be made with the system 100.

The control unit 110 has a spatial audio echo canceller (not shown) for multiple channels (e.g., 3, 4, or more channels), which is used to deal with echo cancellation in the multi-channel system 100. The echo canceller enables the system 100 to capture audio with live microphones even through multiple channels of audio are rendered by the loudspeakers 164-LCR and 166-LCR. As will be appreciated, the system 100 in FIG. 10A requires a six channel acoustic echo canceller for the six independent loudspeaker paths provided.

Figure 10B:
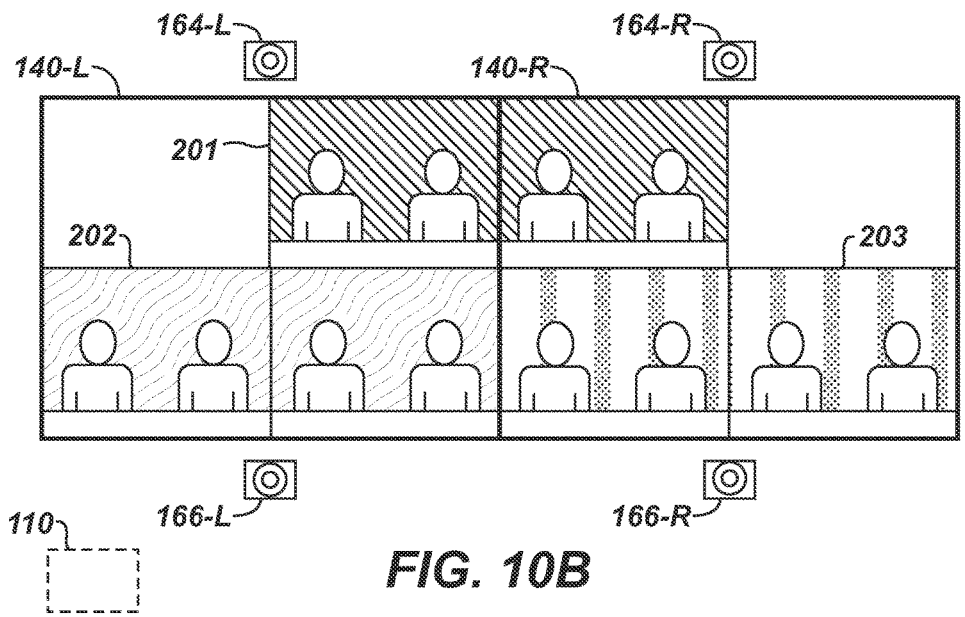

In FIG. 10A, the system 100 has a large video wall or screen 200 with the loudspeakers 164-LCR and 166-LCR configured as separate channels. The same can be applied to systems 100 having multiple screens or electronic displays. For example, FIG. 10B shows a comparable system 100 having first and second electronic displays 140-LR displaying three sites 201, 202, and 203 in a multi-point videoconference call. As shown, the video for the first site 201 can be split between the two displays 140-LR as capabilities allow. Audio for the first site 201 can be rendered in either the top left loudspeaker 164-L or the top right loudspeaker 164-R. Alternatively, the original stereo audio for the first site 201 can be rendered in the two top loudspeakers 164-LR to match the location of the participants in this site 201.

Continuing with the other sites 202 and 203, audio for the second site 202 can be rendered from the bottom left loudspeaker 166-L, and audio for the third site 203 can be rendered from the bottom right loudspeaker 166-R. Other configurations can be used as well depending on what systems are connected together in the multi-point videoconference call. For instance, the video depicted in FIG. 10B for the second and third sites 202 and 203 may actually comprise video from a four camera system, which the system 100 displays across the four bottom panels in the two displays 140-LR. Stereo audio from such a single (four camera) system can be rendered from the two bottom loudspeakers 166-LR. Because this system can render audio from four channels, the control unit 110 preferably has capabilities of a four channel echo canceller.

Figure 10C:
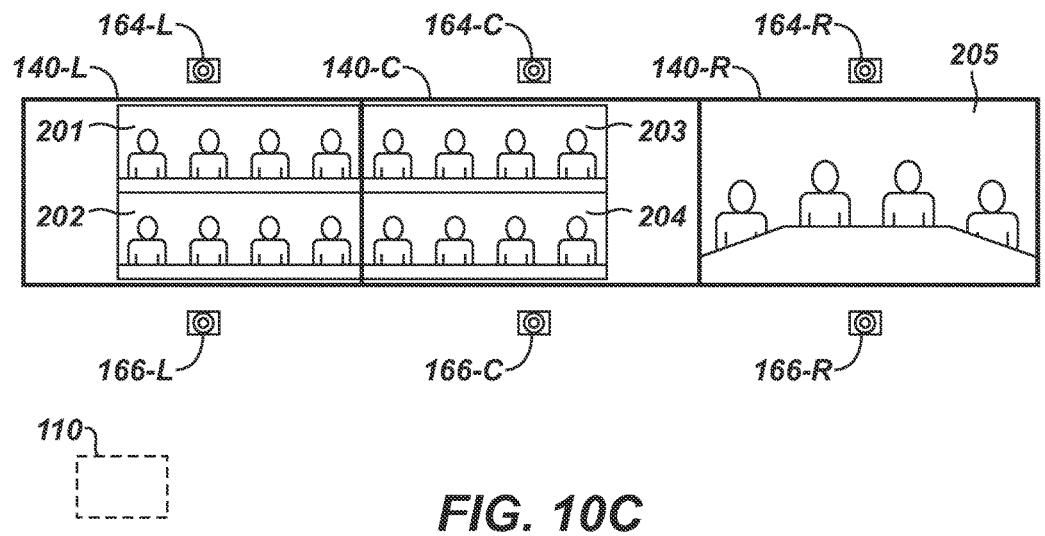

Finally, FIG. 10C shows one additional example where five multipoint sites 201-205 are displayed on three displays 140-LCR. Following the usual configuration, audio from the sites 201-204 can be respectively rendered by top left loudspeaker 164-L, bottom left loudspeaker 166-L, top center loudspeaker 164-C, and bottom center loudspeaker 166-C. Audio from the fifth site 205 can be rendered by the top right and bottom right loudspeakers 164-R and 166-R as a vertical loudspeaker pair comparable to other embodiments disclosed herein.

As will be appreciated, teachings of the present disclosure can be implemented in digital electronic circuitry, computer hardware, computer firmware, computer software, or any combination thereof. Teachings of the present disclosure can be implemented in a computer program product tangibly embodied in a machine-readable storage device for execution by a programmable processor so that the programmable processor executing program instructions can perform functions of the present disclosure. The teachings of the present disclosure can be implemented advantageously in one or more computer programs that are executable on a programmable system including at least one programmable processor coupled to receive data and instructions from, and to transmit data and instructions to, a data storage system, at least one input device, and at least one output device. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

The foregoing description of preferred and other embodiments is not intended to limit or restrict the scope or applicability of the inventive concepts conceived of by the Applicants. It will be appreciated with the benefit of the present disclosure that features described above in accordance with any embodiment or aspect of the disclosed subject matter can be utilized, either alone or in combination, with any other described feature, in any other embodiment or aspect of the disclosed subject matter.

In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A videoconferencing system, comprising
   at least one display having a top and a bottom;
   a plurality of top loudspeakers arranged toward the top of the at least one display;
   a plurality of bottom loudspeakers arranged toward the bottom of the at least one display; and
   a control unit operatively coupled to the top loudspeakers and the bottom loudspeakers, the control unit being configured to:
      route first video to a first display portion of the at least one display;
      selectively route, based on the routing of the first video, first audio associated with the first video to at least one of any of the top loudspeakers, any of the bottom loudspeakers, and both of any of the top and bottom loudspeakers arranged relative to the first display portion;
      route second video to a second display portion of the at least one display; and
      selectively route, based on the routing of the second video, second audio associated with the second video to at least one of any of the top loudspeakers, any of the bottom loudspeakers, and both of any of the top and bottom loudspeakers arranged relative to the second display portion,
      wherein to route the first and second audio, the control unit emphasizes a lower frequency of a portion of the first and second audio routed to the top loudspeakers than routed to the bottom loudspeakers.

2. The system of claim 1, wherein the at least one display comprises a plurality of electronic screens disposed adjacent one another.

3. The system of claim 2, wherein the top and bottom loudspeakers are arranged in vertical pairs, each of the electronic screens having at least one of the vertical pairs.

4. The system of claim 2, wherein the control unit is configured to:
   route the first video to a first of the electronic screens as the first display portion, and
   route the second video to a second of the electronic screens as the second display portion.

5. The system of claim 1, wherein the at least one display comprises at least one projector screen having the first and second video projected thereon.

6. The system of claim 1, wherein the at least one display comprises at least one projector projecting the first and second video.

7. The system of claim 1, wherein the at least one display comprises an acoustically transparent display having any one or more of the top and bottom loudspeakers disposed inside an outer perimeter thereof.

8. The system of claim 1, wherein any one or more of the top and bottom loudspeakers are disposed outside an outer perimeter of the at least one display.

9. The system of claim 1, wherein the top loudspeakers comprise a first top loudspeaker disposed relative to the first display portion; wherein the bottom loudspeakers comprise a first bottom loudspeaker disposed relative to the first display portion; and wherein to route the first audio, the control unit is configured to route at least a portion of the first audio to the first top loudspeaker and at least a portion of the first audio to the first bottom loudspeaker.

10. The system of claim 9, wherein to route the first audio, the control unit emphasizes the lower frequency of the portion of the first audio routed to the first top loudspeaker than routed to the first bottom loudspeaker.

11. The system of claim 9, wherein the top loudspeakers comprise a second top loudspeaker disposed relative to the second display portion; wherein the bottom loudspeakers comprise a second bottom loudspeaker disposed relative to the second display portion; and wherein to route the second audio, the control unit is configured to route at least a portion of the second audio to the second top loudspeaker and at least a portion of the second audio to the second bottom loudspeaker.

12. The system of claim 11, wherein to route the second audio, the control unit emphasizes the lower frequency of the portion of the second audio routed to the second top loudspeaker than routed to the second bottom loudspeaker.

13. The system of claim 11, wherein the at least one display comprises an intermediate display portion disposed between the first and second display portions; and wherein the control unit is configured to:
route third video to the intermediate display portion; and
route third audio associated with the third video to any one or both of the top and bottom loudspeakers arranged relative to the intermediate display portion.

14. The system of claim 13, wherein the top loudspeakers comprise a third top loudspeaker disposed relative to the intermediate display portion; wherein the bottom loudspeakers comprise a third bottom loudspeaker disposed relative to the intermediate display portion; and wherein the control unit is configured to route at least a portion of the third audio to the third top loudspeaker and at least a portion of the third audio to the third bottom loudspeaker.

15. The system of claim 14, wherein to route the third audio, the control unit emphasizes the lower frequency of the portion of the third audio routed to the third top loudspeaker than routed to the third bottom loudspeaker.

16. The system of claim 13, wherein the bottom loudspeakers comprise a third bottom loudspeaker disposed relative to the intermediate display portion; and wherein the control unit is configured to route at least a portion of the third audio to the first and second top loudspeakers and at least a portion of the third audio to the third bottom loudspeaker.

17. The system of claim 16, wherein to route the third audio, the control unit emphasizes a higher frequency of the portion of the third audio routed to the third bottom loudspeaker than routed to the first and second top loudspeakers.

18. The system of claim 13, wherein the top loudspeakers comprise a third top loudspeaker disposed relative to the intermediate display portion; and wherein the control unit is configured to route at least a portion of the third audio to the third top loudspeaker and at least a portion of the third audio to the first and second bottom loudspeaker.

19. The system of claim 18, wherein to route the third audio, the control unit emphasizes the lower frequency of the portion of the third audio to the third top loudspeaker than routed to the first and second bottom loudspeakers.

20. The system of claim 1, wherein the first video routed to the first display portion is of a first site in a multipoint videoconference, and wherein the second video routed to the second display portion is of a second site in the multipoint videoconference.

21. The system of claim 1, wherein the first video is of a site of a multipoint videoconference routed to a top display portion of the at least one display as the first display portion; and wherein the control unit is configured to route the first audio to at least one of the top loudspeakers arranged relative to the top display portion.

22. The system of claim 1, wherein the first video is of a site of the multipoint videoconference routed to a bottom display portion of the at least one display as the first display portion; and wherein the control unit is configured to route the first audio to at least one of the bottom loudspeakers arranged relative to the bottom display portion.

23. A videoconferencing method, comprising
displaying video of a videoconference with at least one display by—
routing first video to a first display portion of the at least one display, and
routing second video to a second display portion of the at least one display; and
playing audio of the videoconference with a plurality of top loudspeakers arranged toward a top of the at least one display and with a plurality of bottom loudspeakers arranged toward a bottom of the at least one display by—
selectively routing, based on the routing of the first video, first audio associated with the first video to at least one of any of the top loudspeakers, any of the bottom loudspeakers, and both of any of the top and bottom loudspeakers arranged relative to the first display portion,
selectively routing, based on the routing of the second video, second audio associated with the second video to at least one of any of the top loudspeakers, any of the bottom loudspeakers, and both of any of the top and bottom loudspeakers arranged relative to the second display portion, and
emphasizing a lower frequency of a portion of the first and second audio routed to the top loudspeakers than routed to the bottom loudspeakers.

24. A programmable storage device having program instructions stored thereon for causing a programmable control device to perform a videoconferencing method, comprising:
displaying video of a videoconference with at least one display by—
routing first video to a first display portion of the at least one display, and
routing second video to a second display portion of the at least one display; and
playing audio of the videoconference with a plurality of top loudspeakers arranged toward a top of the at least one display and with a plurality of bottom loudspeakers arranged toward a bottom of the at least one display by—
selectively routing, based on the routing of the first video, first audio associated with the first video to at least one of any of the top loudspeakers, any of the bottom loudspeakers, and both of any of the top and bottom loudspeakers arranged relative to the first display portion,
selectively routing, based on the routing of the second video, second audio associated with the second video to at least one of any of the top loudspeakers, any of the bottom loudspeakers, and both of any of the top and bottom loudspeakers arranged relative to the second display portion, and
emphasizing a lower frequency of a portion of the first and second audio routed to the top loudspeakers than routed to the bottom loudspeakers.

* * * * *